(12) United States Patent
Cooney (10) Patent No.: US 6,993,907 B2
(45) Date of Patent: Feb. 7, 2006

(54) AUTOMOTIVE HYDRAULIC BRAKING SYSTEM AND A HYDRAULIC BRAKE INTENSIFYING APPARATUS FOR USE THEREIN

(75) Inventor: Leo Cooney, Gross Pointe, MI (US)

(73) Assignee: Janel Hydro Co., Grosse Pointe, MI (US)

( * ) Notice: Subject to any disclaimer, the term of this patent is extended or adjusted under 35 U.S.C. 154(b) by 0 days.

(21) Appl. No.: 10/797,305

(22) Filed: Mar. 10, 2004

(65) Prior Publication Data

US 2005/0198955 A1 Sep. 15, 2005

(51) Int. Cl.
*B60T 13/58* (2006.01)
*F15B 7/08* (2006.01)
(52) U.S. Cl. .......................................... 60/563; 60/579
(58) Field of Classification Search ................. 60/563, 60/579, 593, 575, 574, 562
See application file for complete search history.

(56) References Cited

U.S. PATENT DOCUMENTS

| | | | |
|---|---|---|---|
| 2,734,342 A * | 2/1956 | Mallory | 60/579 |
| 2,909,035 A | 10/1959 | Mitton | |
| 3,010,282 A | 11/1961 | Jansson | |
| 3,252,740 A | 5/1966 | Stelzer | |
| 3,277,650 A | 10/1966 | Cripe | |
| 3,425,222 A * | 2/1969 | Cooney et al. | 60/563 |
| 3,768,608 A | 10/1973 | Fulmer | |
| 3,825,308 A | 7/1974 | Kasselman et al. | |
| 3,890,012 A | 6/1975 | O'Toole | |
| 3,942,326 A | 3/1976 | Hayashida | |
| 4,976,190 A | 12/1990 | Cooney | |
| 5,048,397 A | 9/1991 | Cooney | |
| 5,349,820 A * | 9/1994 | Yanagi et al. | 60/562 |
| 5,480,222 A | 1/1996 | Cooney | |
| 5,496,099 A | 3/1996 | Resch | |
| 6,467,391 B2 * | 10/2002 | Desai et al. | 91/398 |
| 6,547,048 B2 | 4/2003 | Haerr et al. | |

FOREIGN PATENT DOCUMENTS

DE  1 530 916  1/1965

* cited by examiner

*Primary Examiner*—Edward K. Look
*Assistant Examiner*—Michael Leslie
(74) *Attorney, Agent, or Firm*—Howard & Howard (57) ABSTRACT

The subject invention provides an improved hydraulic braking system and a hydraulic pressure intensifying apparatus (10) for use in the braking system. The braking system includes a master cylinder assembly (26, 126), with the intensifying apparatus (10) incorporated into a hydraulic fluid line (34, 134) extending to brakes (11, 13) of a vehicle (16). The intensifying apparatus includes a cylindrical chamber (42) having an inlet end (44) and an outlet end (46). The chamber (42) is sealed by a first end wall (116) at the inlet end (44). A piston assembly (52) is slidably supported in the chamber (42). The piston assembly (52) includes a first piston (54) having a first outer annular wall (100). A biasing means (60) extending axially through the chamber (42) biases the first piston (54) against the first end wall (116). One of the first piston (54) and the first end wall (116) defines an aperture (110) for allowing fluid to flow into the piston assembly (52) from the inlet end (44) of the chamber (42).

31 Claims, 8 Drawing Sheets

AUTOMOTIVE HYDRAULIC BRAKING SYSTEM AND A HYDRAULIC BRAKE INTENSIFYING APPARATUS FOR USE THEREIN

FIELD OF THE INVENTION

The subject invention relates to hydraulic braking systems, and more particularly to an improved piston assembly disposed in a brake pressure intensifying apparatus of a vehicular braking system.

BACKGROUND OF THE INVENTION

Multistage hydraulic pressure boosters for use in vehicular braking systems are relatively well known in the prior art. Such pressure boosters, or brake pressure intensifying apparatuses, employ a system of concentric pistons to obtain a gradual boost in wheel cylinder pressure, providing a brake pedal feel comparable to that provided by power assisted vehicular braking systems. Such prior art pressure intensifying apparatuses are illustrated in the U.S. Pat. No. 3,010,282 to Jansson, and the U.S. Pat. Nos. 3,425,222, 4,976,190, 5,048,397, and 5,480,222 to Cooney. These references disclose a self-contained apparatus installed along a hydraulic fluid line extending between a master cylinder and wheel cylinders of a vehicle. A fluid cylinder includes a cylindrical chamber and a piston assembly slidably disposed in the chamber. The piston assembly includes a first piston and an inner piston concentrically disposed in the first piston for telescopic sliding movement within the first piston. The inner piston defines a flow passage for communicating the fluid through the inner piston. A spring-loaded check valve is disposed in the flow passage of the inner piston. A compression spring biases the piston assembly toward an inlet end of the cylinder.

The brake pressure intensifying apparatus is actuated by fluid pressure delivered from the master cylinder. When an operator of the vehicle applies force to the brake pedal, fluid pressure from the master cylinder is transmitted to the inlet end of the brake pressure intensifying apparatus, moving the fluid straight through both the flow passage of the inner piston and the check valve to the wheel cylinders without providing any pressure intensification. When a pre-determined level of pressure is exerted from the master cylinder, the first piston and the inner piston move together or "lift off" against the biasing pressure of the spring and allow the check valve to close. This movement gradually increases the fluid pressure due to the fact that the inlet ends of each of the first piston and the inner piston are larger in diameter than at their respective outlet ends. As pressure increases in the master cylinder, the two pistons continue to move together until the first piston is stopped by an annular ledge extending inwardly into the chamber from the cylinder. The inner piston, however, is not so restrained and continues to move in the cylinder.

One of the deficiencies of the prior art intensifying apparatuses is that prior to lift off of the piston assembly, the biasing pressure of the compression spring on the piston assembly forces the first piston into contact with a first end wall that seals the chamber proximal to the inlet end of the fluid cylinder, thus partially blocking the flow passage and impeding the flow of fluid into the flow passage of the inner piston. As a result, fluid pressure through the intensifying apparatuses may be erratic and unpredictable during an initial braking period, i.e., prior to lift off, as the fluid seeps into the flow passage in spurts or at a variable rate, depending on minor piston movement. The erratic and unpredictable fluid pressures may affect braking feel and performance.

Another deficiency of the prior art braking systems is that the intensifying apparatuses generally increase the fluid pressure for the entire braking system, i.e., fluid pressure to each of the wheels is increased. As a result, reducer valves are ordinarily required in the fluid line going to the rear wheels of the vehicle for reducing braking pressure to the rear wheels and preventing the rear wheels from locking during a braking situation. The reducer valves add additional cost to the braking system.

Thus, there is an opportunity to provide a hydraulic brake pressure intensifying apparatus and a brake system including the intensifying apparatus that promotes smooth and controlled flow characteristics of fluid through the intensifying apparatus, that renders the fluid pressure from the inlet end of the fluid cylinder through the intensifying apparatus more consistent, and that provides an improved braking feel and performance, particularly during an initial braking period.

SUMMARY OF THE INVENTION AND ADVANTAGES

The subject invention provides a hydraulic brake pressure intensifying apparatus of the type for boosting the hydraulic pressure in a vehicular braking system. The apparatus includes a fluid cylinder axially extending between an inlet end and an outlet end. A piston assembly is disposed in the fluid cylinder for regulating fluid flow between the inlet end and the outlet end. The piston assembly includes a first piston having a first forward end adjacent the inlet end. A first outer annular wall extends from the first forward end of the first piston. The apparatus is characterized by one of the fluid cylinder and the first outer annular wall defining an aperture for allowing fluid to flow into the piston assembly from the inlet end of the fluid cylinder.

The subject invention also provides an improved braking system for a vehicle. The system includes a brake, a master cylinder, a hydraulic fluid line, and a brake pressure intensifying apparatus. The master cylinder applies pressure to brake fluid and supplies the brake fluid to the brake. The hydraulic fluid line extends from the master cylinder for channeling the brake fluid to the brake. The brake pressure intensifying apparatus is incorporated into the hydraulic fluid line for exponentially amplifying the pressure of the brake fluid from the master cylinder to the brake. The brake pressure intensifying apparatus includes a fluid cylinder that axially extends between an inlet end and an outlet end. A piston assembly is disposed in the cylinder for regulating fluid flow between the inlet end and the outlet end. The piston assembly includes a first piston having a first forward end. A first outer annular wall extends from the first forward end. The system is characterized by one of the fluid cylinder and the first outer annular wall defining an aperture for allowing fluid to flow into the piston assembly from the inlet end of the fluid cylinder.

It has been found that the intensifying apparatus including the aperture in one of the fluid cylinder and the first outer annular wall promotes smooth and controlled fluid flow from the inlet end of the fluid cylinder through the flow passage, renders the fluid pressure through the intensifying apparatus more consistent, and provides an improved braking feel and performance, particularly during an initial braking period prior to lift off of the piston assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
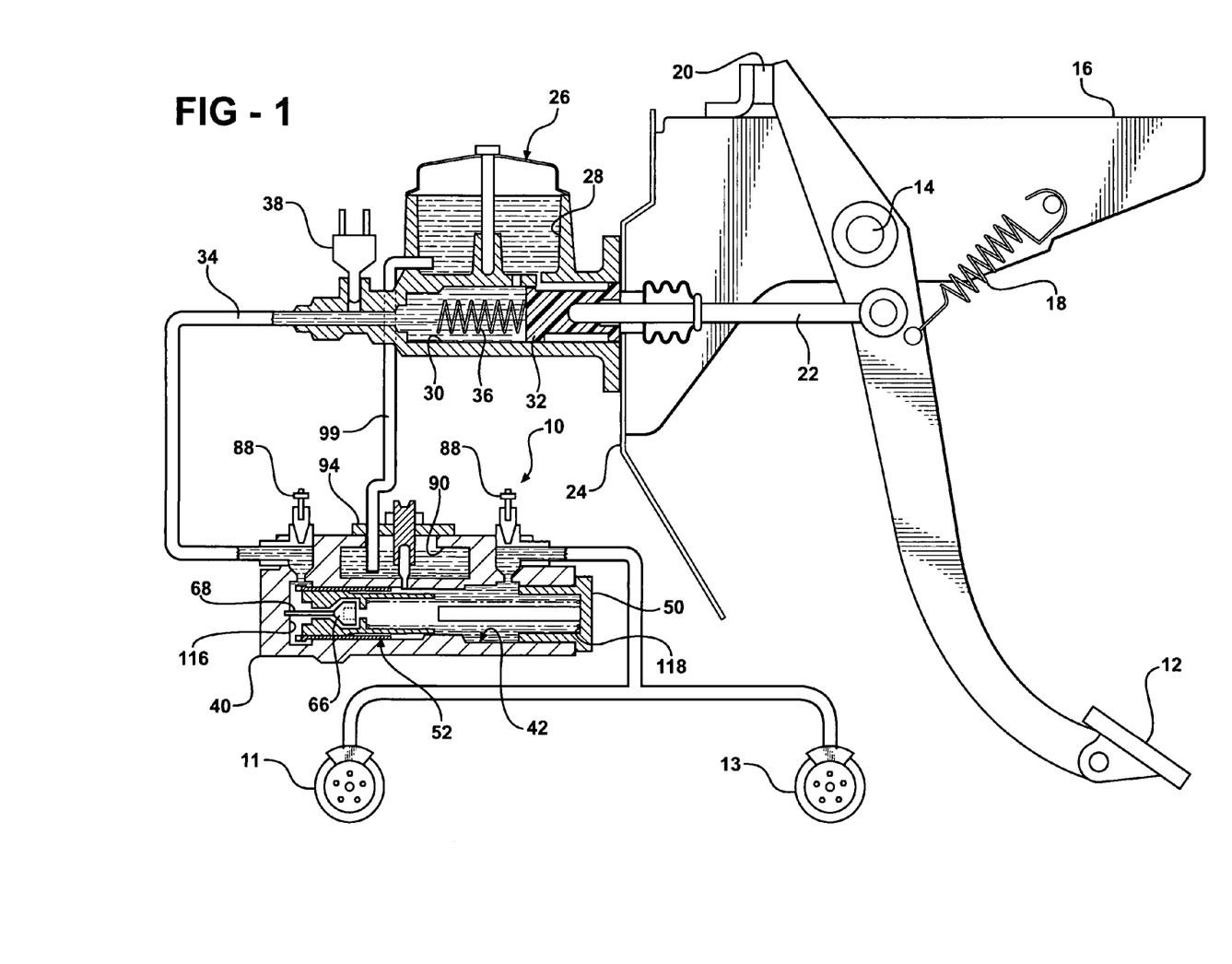
FIG. 1 is a schematic diagram of a vehicular braking system including a cross-sectional view of a hydraulic brake pressure intensifying apparatus of the subject invention connected to a hydraulic fluid line proximal to a master cylinder assembly.
Figure 2:
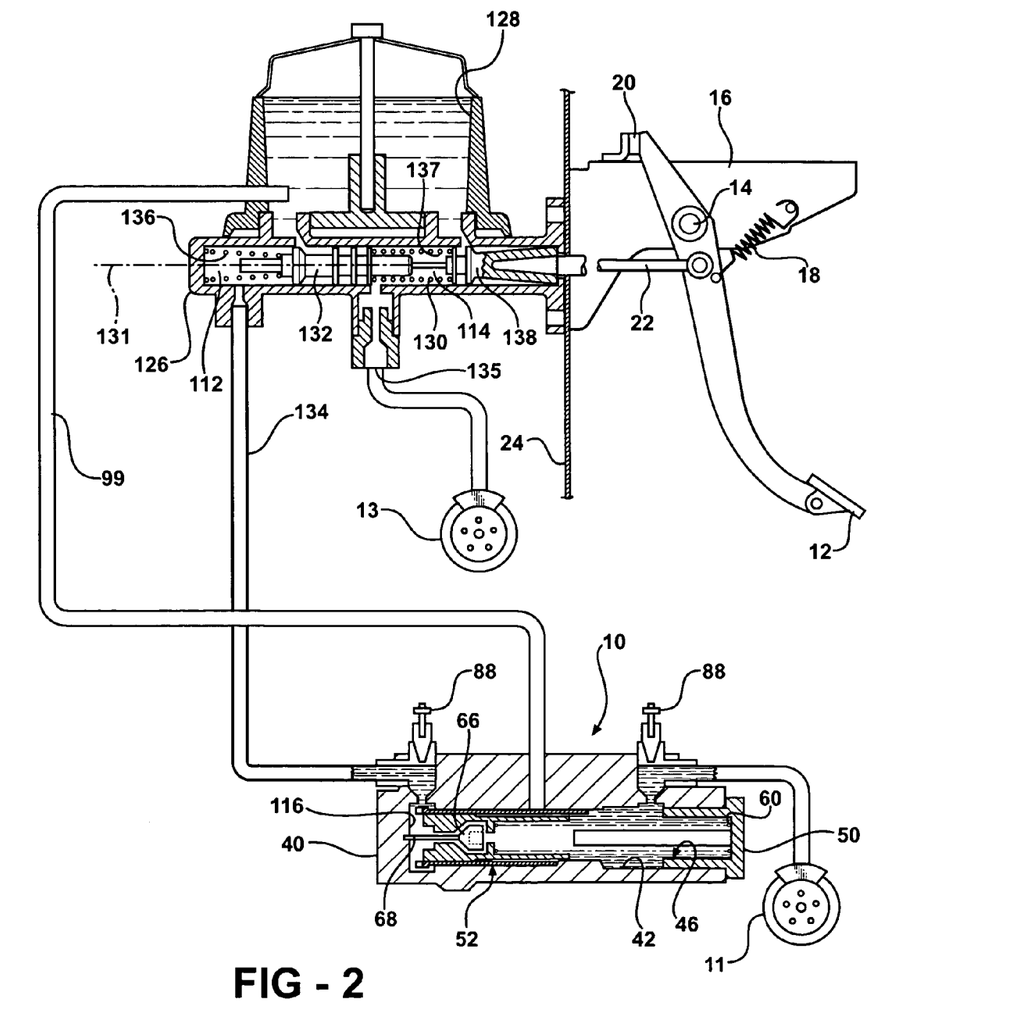
FIG. 2 is a schematic diagram of a vehicular braking system including a hydraulic brake pressure intensifying apparatus of the subject invention connected to a hydraulic fluid line extending from a split master cylinder assembly.

Referring to the Figures, wherein like numerals indicate like or corresponding parts throughout the several views, a hydraulic brake pressure intensifying apparatus according to the subject invention is generally shown at 10. A schematic diagram of a braking system for a vehicle is shown in FIG. 1. It will be appreciated by those skilled in the art that the intensifying apparatus 10 may be practiced in other types of braking systems than that shown in FIG. 1, such as a braking system including a split master cylinder as shown in FIG. 2. The braking system includes a brake pedal 12 pivotally attached about a pivot axis 14 to a portion of a vehicle 16. An extension spring 18 extends between the brake pedal 12 and the bracket portion of the vehicle 16 for urging the brake pedal 12 toward a fixed stop member 20. A push rod 22 is pivotally attached to the brake pedal 12 and extends through a fire wall portion 24 of the vehicle 16.

In the embodiment shown in FIG. 1, a master cylinder assembly 26 is attached in a fixed position to the engine compartment side of the fire wall 24, opposite the brake pedal 12. The master cylinder assembly 26 includes a fluid reservoir 28 disposed above and in fluid communication with a master cylinder 30. The master cylinder 30 applies pressure to fluid and supplies the fluid brakes 11, 13 of the vehicle 16. More specifically, a piston 32 is slidably disposed in the master cylinder 30 for urging fluid out of the master cylinder 30 and into an associated hydraulic fluid line 34. The hydraulic fluid line 34 extends from the master cylinder 30 for channeling the fluid to the brakes 11, 13. The push rod 22 connected to the brake pedal 12 extends to the piston 32 of the master cylinder assembly 26 so that as an operator applies pressure to the brake pedal 12, the piston 32 in the master cylinder 30 urges fluid into the hydraulic fluid line 34. A return spring 36 is disposed in the master cylinder 30 for urging the piston 32 toward an unactuated position in the master cylinder 30 as pressure on the brake pedal 12 is decreased. A fluid pressure sensor 38 communicates with the hydraulic fluid line 34, downstream of the master cylinder assembly 26, for sending a signal to a warning light or gauge visible to the operator of the vehicle 16 to alert the operator in the event hydraulic fluid pressure decreases below a minimum value. The hydraulic fluid line 34 extends from the master cylinder assembly 26 to each of the brakes 11, 13, more specifically the brake actuators, at the four wheels of the vehicle 16. The brake pressure intensifying apparatus 10 is connected to the hydraulic fluid line 34 adjacent the master cylinder assembly 26.

In another embodiment, as shown in FIG. 2, the braking system includes a split master cylinder assembly 126. The split master cylinder assembly 126 includes a hydraulic fluid reservoir 128 and a split master cylinder 130 in fluid communication with the hydraulic fluid reservoir 128. The hydraulic fluid reservoir 128 is disposed above the split master cylinder 130. First 132 and second 138 split cylinder pistons are disposed within the split master cylinder 130 and are aligned along a longitudinal axis 131. The split master cylinder assembly 126 defines a first chamber 112 within the split master cylinder 130 adjacent to the first split cylinder piston 132 and distal to the second split cylinder piston 138. The split master cylinder assembly 126 further defines a second chamber 114 within the split master cylinder 130 between the first 132 and second 138 split cylinder pistons. A first compression spring 136 is disposed in the first chamber 112 and a second compression spring 137 is disposed in the second chamber 114 for urging the first 132 and second 138 pistons, respectively, toward an unactuated position in the split master cylinder 130 as pressure on the brake pedal 12 is decreased. The hydraulic fluid line 134 and a second hydraulic fluid line 135 are in fluid communication with the first 112 and second 114 chambers, respectively. The first chamber 112 is larger than the second chamber 114 for providing greater fluid flow to the hydraulic fluid line 134 when the first 132 and second 138 split cylinder pistons are actuated. The push rod 22 that is connected to the brake pedal 12 extends to the second split cylinder piston 138 such that, as an operator applies pressure to the brake pedal 12, force is transferred to the second split cylinder piston 138, which, in turn, transfers a force to the first split cylinder piston 132 through hydraulic pressure. The first 132 and second 138 split cylinder pistons urge fluid into the hydraulic fluid line 134 and the second hydraulic fluid line 135, respectively. As pressure on the brake pedal 12 is decreased, the first 136 and second 137 compression springs expand, thereby forcing the first 132 and second 138 split cylinder pistons toward an unactuated position in the split master cylinder 130. Fluid pressure sensors 38 communicate with the hydraulic fluid line 134 and the second hydraulic fluid line 135, downstream of the split master cylinder assembly 126 for sending a signal to a warning light or gauge visible to the operator of the vehicle 16, thus alerting the operator in the event hydraulic fluid pressure decreases below a minimum value. The hydraulic fluid line 134 extends from the first chamber 112 of the split master cylinder 130 to the brake pressure intensifying apparatus 10, from which the hydraulic fluid line 134 extends to the front brakes 11, more specifically the brake actuators, at the front wheels of the vehicle 16. The second hydraulic fluid line 135 extends from the second chamber 114 of the split master cylinder assembly 126 to the rear brakes 13, more specifically brake actuators, at the rear wheels of the vehicle 16. The brake pressure intensifying apparatus 10 is connected to the hydraulic fluid line 134. Thus, when force is applied to the brake pedal 12, the split master cylinder assembly 126 urges more fluid into the hydraulic fluid line 134 than the second hydraulic fluid line 135, which generates greater pressure in the first hydraulic fluid line 134.

Figure 13:
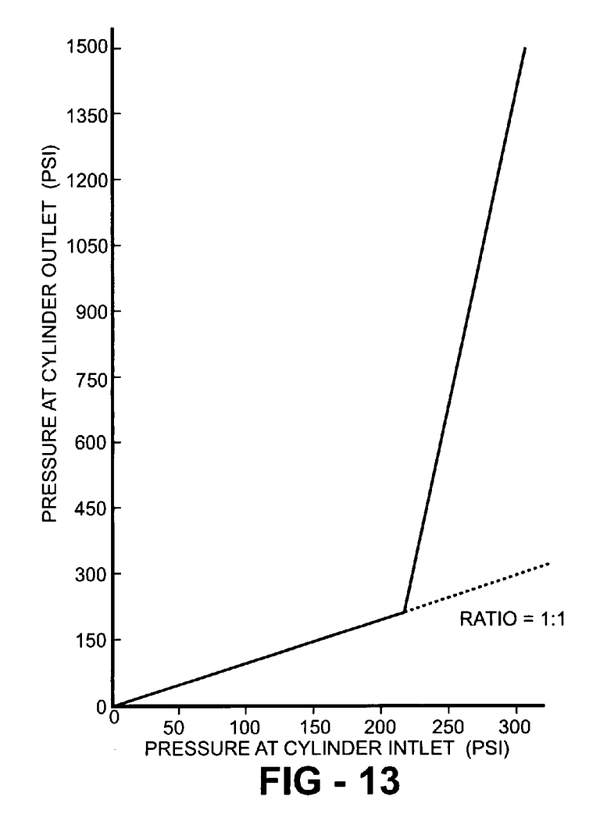
FIG. 13 is a graph showing the smooth pressure intensification provided by the subject invention for the embodiment of FIG. 1.
Figure 14:
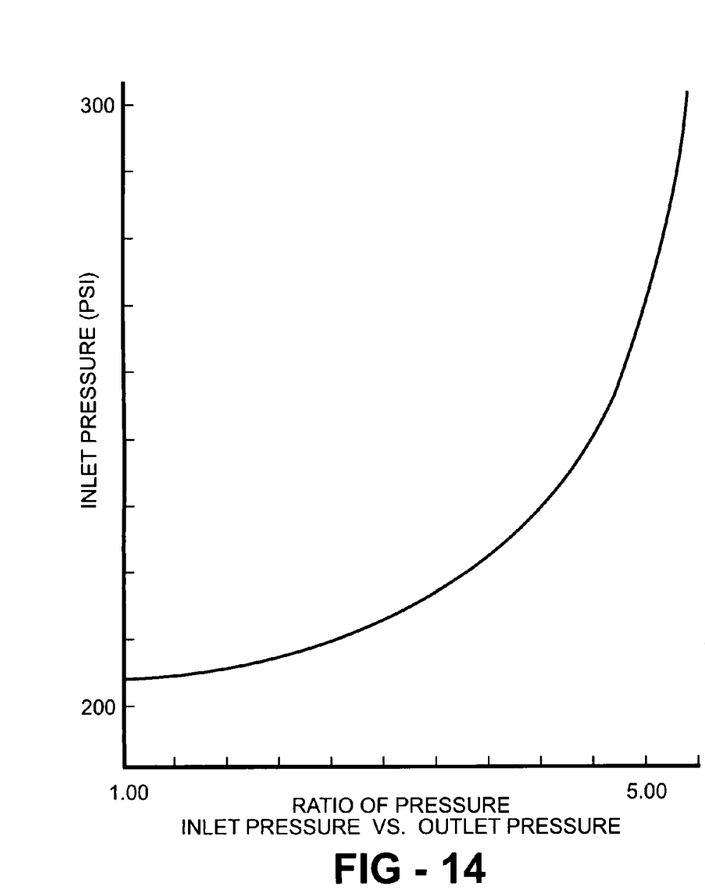
FIG. 14 is a graph showing the ratio of inlet to outlet pressures over a range of inlet pressures for the embodiment of FIG. 1.
Figure 15:
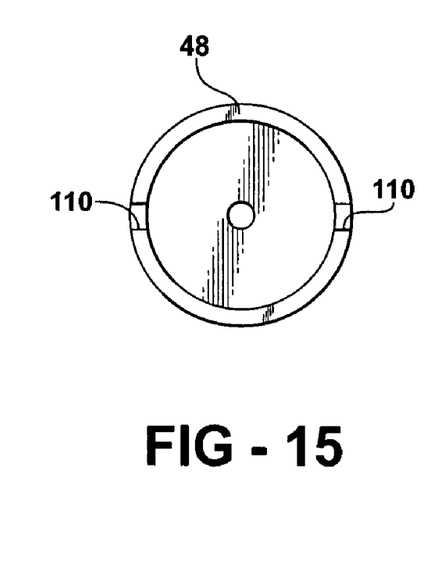
FIG. 15 is a front view of a plug.
Figure 16:
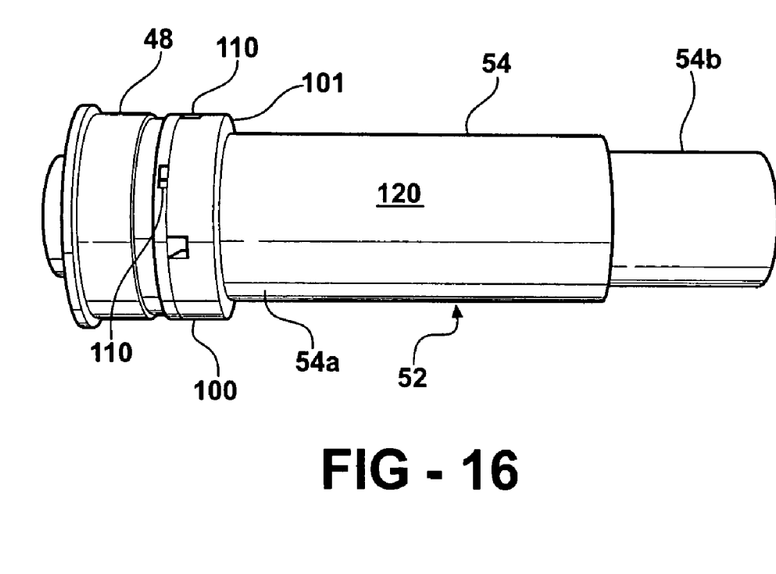
FIG. 16 is a side view of the first piston abutting the plug at the first progressive stage of operation.

For both of the brake systems, the pressure in the hydraulic fluid line 134 and, for the brake system including the split master cylinder assembly 126, the second hydraulic fluid line 135, increases in a linear function as force is applied to the brake pedal 12. The linear function is defined by a constant ratio of a measure of force into the split master cylinder assembly 126 to outlet pressure for the hydraulic fluid line 134 and the second hydraulic fluid line 135, i.e., a straight line curve with a constant slope. As shown in FIG. 13, the brake pressure intensifying apparatus 10 amplifies pressure in an exponential function in the hydraulic fluid line 134 upon the inlet pressure reaching a predetermined threshold. Referring to FIG. 14, the exponential function is defined by an increasing ratio of the measure of force applied to the brake pedal 12 to outlet pressure from the brake pressure intensifying apparatus 10, i.e., a curve having a constantly increasing slope. Resulting pressure increase to the front brakes 11 is up to 5 times greater than the inlet pressure to the intensifying apparatus 10 when the inlet pressure is about 300 pounds force. Meanwhile, for the braking system including the split master cylinder assembly 126, the ratio of force applied to the brake pedal 12 to outlet pressure for the second hydraulic fluid line 135 remains constant.

By combining the split master cylinder assembly 126 with the brake pressure intensifying apparatus 10 in the hydraulic fluid line 134, the intensifying apparatus 10 is able to achieve a 5:1 pressure amplification to the front wheels 11. As a result, the pressure amplification is such that sufficient force is provided to the front wheels to stop the vehicle 16, without pressure to the rear wheels 13 being amplified from the split master cylinder assembly 126. Thus, reducer valves are no longer required in the second hydraulic fluid line 135 extending to the rear brakes 13 since the fluid pressure is not amplified to the rear brakes 13. During hard braking, the reducer valves ordinarily act to prevent the rear brakes 13 from locking by relieving pressure from the second hydraulic fluid line 135 when pressure reaches a certain threshold while increasing pressure to the first hydraulic fluid line 134 sufficient to stop the vehicle 16 quickly. However, by employing the brake pressure intensifying apparatus 10 with the split master cylinder assembly 126, the pressure is sufficiently increased to the hydraulic fluid line 134 to stop the vehicle 16 quickly, without increasing the pressure to the second hydraulic fluid line 135 enough to cause the rear brakes 13 to lock. Thus, the need for reducer valves in the second hydraulic fluid line 135 is eliminated. By eliminating the need for reducer valves, the cost for the braking system of the subject invention is further reduced.

Figure 3:
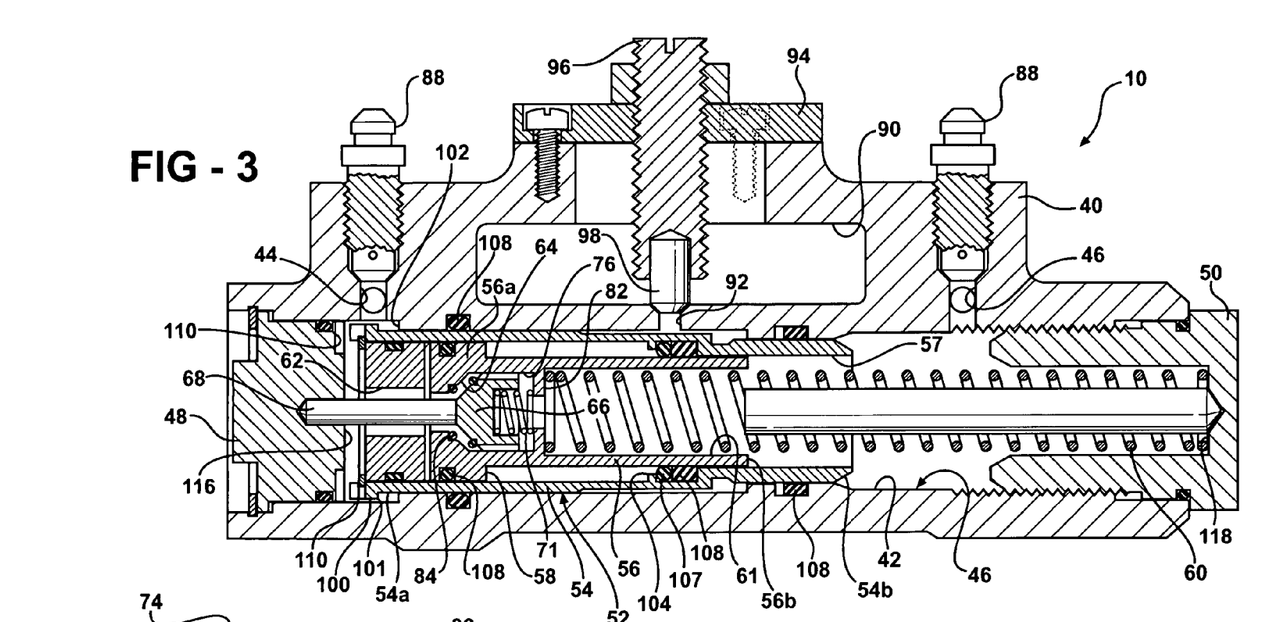
FIG. 3 is a cross-sectional view of the hydraulic brake pressure intensifying apparatus of the subject invention.

The brake pressure intensifying apparatus 10 is best shown in FIG. 3 and includes a cast iron fluid cylinder 40 that extends between an inlet end 44 and an outlet end 46. A cylindrical chamber 42 is defined longitudinally through the fluid cylinder 40. The fluid cylinder 40 includes a first end wall 116 for sealing the chamber 42 proximal to the inlet end 44 of the chamber 42 and a second end wall 118 for sealing the chamber 42 proximal to the outlet end 46. For ease of manufacture, the cylindrical chamber 42 preferably extends completely through the fluid cylinder 40, with a plug 48 and a second plug 50 disposed proximal to the inlet 44 and outlet 46 ends, respectively, to provide a fluid-tight seal and thereby prevent leakage of fluid from the fluid cylinder 40 even at elevated pressures. The plug 48 and the second plug 50 are coaxial with the cylindrical chamber 42 and have a diameter less than a diameter of the cylindrical chamber 42 at the inlet end 44 and the outlet end 46, respectively, for sealing the chamber 42 at the inlet end 44 and the outlet end 46.

A piston assembly, generally indicated at 52 in FIG. 3, is slidably disposed along the axis of the cylindrical chamber 42 for regulating fluid flow between the inlet end 44 and the outlet end 46. The piston assembly 52 is responsive to fluid pressure adjacent the inlet end 44 of the chamber 42 for providing a gradual, non-linear fluid pressure boost at the outlet end 46 of the chamber 42. As will be later described in detail, the piston assembly 52 boosts the inlet pressure in a smoothly transitioning manner, and applies this boosted pressure to the brake actuators at the wheels. More particularly, as an operator of the vehicle 16 applies pressure to the brake pedal 12, the piston 32, 132 in the master cylinder 30, 130 is moved to create a fluid pressure in the hydraulic fluid line 34, 134. The fluid pressure created by the master cylinder piston 32, 132 is linear in nature, wherein the pressure created in the hydraulic fluid line 34, 134 is directly proportional to the amount of pressure applied to the brake pedal 12. Therefore, as the pressure applied to the brake pedal 12 is increased, the fluid pressure in the hydraulic fluid line 34, 134 is increased in a directly proportional manner.

Referring to FIG. 14, the piston assembly 52 of the intensifying apparatus 10 amplifies the pressure exiting the intensifying apparatus 10 at a nonlinear, or nonproportional, rate so that as the fluid pressure in the hydraulic fluid line 34, 134 increases, the fluid pressure created at the outlet end 46 of the chamber 42 gradually increases in a nonlinear manner exceeding the fluid pressure at the inlet end 44 of the chamber 42. The result is that an operator of the vehicle 16 experiences a braking action which is smoothly related to the applied brake pedal pressure. Light pressure applied to the brake pedal 12 will not cause the brakes 11, 13 to grab, and greater pressure applied to the brake pedal 12 will produce a fast controlled stop of the vehicle 16. Therefore, the operator of the vehicle 16 can more easily control skidding or wheel locking of the vehicle 16 and thus more safely maneuver the vehicle 16 during emergency conditions. Additionally, the brake fade phenomena is measurably eliminated and pedal travel is not increased to an excessive point. Further, the vehicle braking system will work equally well whether the engine is running or not running.

The piston assembly 52 of the intensifying apparatus 10 includes a first piston 54 which is slidably disposed along the axis of the chamber 42. The first piston 54 includes a first forward end 54a adjacent the inlet end 44 of the chamber 42 and a first rearward end 54b adjacent the outlet end 46 of the chamber 42. A first outer annular wall 100 extends from the first piston 54 at the first forward end 54a. More specifically, the first piston 54 defines a cylindrical outer surface 120 and the first outer annular wall 100 coaxially extends from the cylindrical outer surface 120 at the first forward end 54a.

Preferably, the first outer annular wall 100 defines an aperture 110, more preferably a plurality of apertures 110, for allowing fluid to flow into the piston assembly 52 from the inlet end 44 of the fluid cylinder 40, more specifically from the chamber 42. In a most preferred embodiment, the plurality of apertures 110 are equally spaced along the first outer annular wall 100 for allowing a balanced flow of fluid into the piston assembly 52. It is to be appreciated that the fluid cylinder 40, more specifically the first end wall 116, may define the aperture 110 proximal to the inlet end 44 for allowing the fluid to flow around the first outer annular wall 100 and into the piston assembly 52 from the inlet end 44 of the chamber 42. When used, the plug 48 may also define the aperture 110. Likewise, the first end wall 116 and the plug 48 may define a plurality of apertures 110 adjacent to the first outer annular wall 100. In other words, when the intensifying apparatus 10 is in the unactuated position, the first piston 54, more specifically the first outer annular wall 100, is biased against the first end wall 116. The aperture 110 is defined in the plug 48 or the first end wall 116 adjacent to a point of contact with the first outer annular wall 100 to enable the fluid to flow around the first outer annular wall 100 when the first piston 54 is in contact with the first end wall 116. The aperture 110 promotes smooth and controlled flow characteristics of fluid through the intensifying apparatus 10 and renders the fluid pressure from the inlet end 44 of the fluid cylinder 40 through the intensifying apparatus 10 more consistent. As a result, the operator experiences improved braking feel and performance, particularly during an initial braking period.

The piston assembly 52 further includes an inner piston 56 that is concentrically disposed for telescopic movement within the first piston 54. The inner piston 56 includes a second forward end 56a adjacent the inlet end 44 of the chamber 42 and a second rearward end 56b adjacent the outlet end 46 of the chamber 42. The first 54 and inner 56 pistons, therefore, are concentric within the chamber 42 and are adapted for free sliding movement therein. The first piston 54 is a generally tubular, or thin-walled, member having a series of internal and external steps, or diameter variations, in the cylindrical outer surface 120 for reasons to be addressed subsequently. Similarly, the inner piston 56 includes at least one external step, or rim, 58 for reasons to be addressed subsequently.

The first forward end 54a of the first piston 54 presents an annular first forward end area comprising the net area over which fluid pressure in the chamber 42 may act to exert a resultant force on the first piston 54 alone. The first rearward end 54b of the first piston 54 presents an annular first rearward end area comprising the net annular area over which fluid pressure in the chamber 42 may act to exert a force to urge the first piston 54 toward the inlet end 44 of the chamber 42. Likewise, the inner piston 56 presents a second forward end area that is fully circular at the second forward end 56a, and a second rearward end area that is also fully circular at its second rearward end 56b.

A biasing means 60 is disposed in the chamber 42 for urging the piston assembly 52 axially toward the inlet end 44 of the chamber 42. The biasing means 60 preferably comprises a compression spring having one end seated in a recess in the second plug 50 and extending axially through the chamber 42 to the inner piston 56. The inner piston 56 includes a recess 61 which telescopically receives a substantial portion of the compression biasing means 60 to support the biasing means 60 during operation.

A flow passage 62 extends axially through the piston assembly 52 for communicating fluid between the inlet end 44 and the outlet end 46 of the fluid cylinder 40, more specifically the chamber 42. The flow passage 62 is centrally disposed through the inner piston 56 along the axis of the chamber 42 for allowing fluid to flow directly through the chamber 42 from the inlet end 44 to the outlet end 46. The flow passage 62 includes a seat surface 64 for reasons to be addressed subsequently.

A valve member is generally indicated at 66 in FIG. 3. The valve member 66 is disposed in the flow passage 62 for regulating fluid flow through the flow passage 62 in response to a predetermined fluid pressure adjacent the inlet end 44 of the chamber 42. For this reason, the end areas of the inner piston 56 are said to be full circular, i.e., when the valve member 66 is closed, whereas the end areas of the first piston 54 are annular irrespective of whether the valve member 66 is open or closed. The valve member 66 includes a pin 68 extending along the axis of the chamber 42 and having an end fixed to the first end wall 116, more specifically, the plug 48. The pin 68 extends centrally through a portion of the flow passage 62 to engage the valve member 66. A valve spring 71 urges, or biases, the valve member 66 toward the seat surface 64 of the flow passage 62. However, when the first 54 and inner 56 pistons are in the position shown in FIG. 6, the pin 68 maintains the valve member 66 in a spaced position from the seat surface 64 in the flow passage 62 to allow fluid to flow therethrough.

The valve member 66 has a frustoconical sealing portion 72, and the seat surface 64 of the flow passage 62 has a matingly shaped surface for mating engagement with the frustoconical sealing portion 72 of the valve member 66 to seal fluid flow through the flow passage 62 at elevated pressures and prevent fluid leakage.

Figure 4:
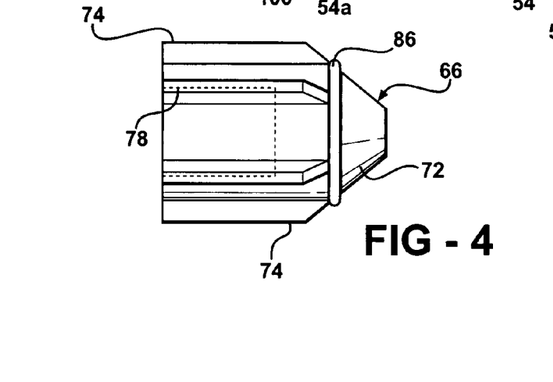
FIG. 4 is a side view of the valve member of the hydraulic brake pressure intensifying apparatus.
Figure 5:
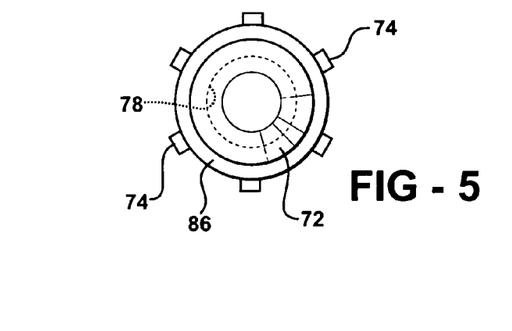
FIG. 5 is an end view of the valve member of FIG. 3.

As best shown in FIGS. 4 and 5, the valve member 66 includes a splined guide portion 74 extending axially from the frustoconical sealing portion 72. The crests of the splines of the guide portion 74 engage an inner wall 76 in the inner piston 56. The splines of the guide portion 74, therefore, provide guided axial movement of the valve member 66 in the flow passage 62, while allowing fluid to flow between adjacent splines. This guided linear movement prevents the valve member 66 from becoming upset, or cocked, inside the flow passage 62. Therefore, the guide portion 74 functions as a means for aligning the frustoconical sealing portion 72 and the frustoconical seat surface 64 of the flow passage 62 to ensure perfect mating alignment during operation, and thereby maintaining optimal sealing characteristics. A cylindrical recess 78 extends axially through one end of the valve member 66, opposite the frustoconical sealing portion 72. The valve spring 71 is disposed in the recess 78 of the valve member 66 and extends to a plate-like wall 82 of the inner piston 56. The valve spring 71 urges the valve member 66 toward the seat surface 64 of the flow passage 62.

The frustoconical sealing portion 72 of the valve member 66 and the frustoconical seat surface 64 of the flow passage 62 are disposed at the same conical angle so that full surface-to-surface contact is achieved to provide the superior sealing capabilities. For further enhancing the sealing capabilities, an O-ring 84 is preferably disposed in the frustoconical seat surface 64 of the flow passage 62, adjacent the smallest diameter portion thereof. Similarly, an O-ring 86 is preferably disposed in the frustoconical sealing portion 74 of the valve member 66, adjacent the largest diameter portion thereof. However, it is to be appreciated that only one of the O-rings 84, 86 is necessary to prevent fluid leakage through the flow passage 62. As best illustrated in FIG. 4, the O-ring 86 of the valve member 66 has an outer peripheral extent slightly smaller than the root diameter of the splined guide portion 74. This allows full, unrestricted fluid flow past the valve member 66. Only a portion of the O-ring 86 extends beyond, or outwardly from, the frustoconical sealing portion 72. Similarly, only a portion of the O-ring 84 extends beyond the frustoconical seat surface 64. In a preferred embodiment, as the valve member 66 engages or mates with the seat surface 64 of the flow passage 62, the two O-rings 84, 86 do not contact each other, but rather engage the associated frustoconical surface of the other member. The portions of the O-rings 84, 86 extending beyond their respective surfaces 64, 72 flatten as the two surfaces 64, 72 are pressed together under the hydraulic pressure. The flattening phenomena of the O-rings 84, 86 occurs only when the frustoconical surface of the seat 64 engages the frustoconical surface of the sealing portion 72. Therefore, it is preferred that the dual O-ring sealing is provided, as well as surface-to-surface contact between the frustoconical sealing portion 72 and the seat surface 64 so that fluid sealing is positively established thereby preventing leakage even at extremely elevated pressures.

When the valve member 66 closes the flow passage 62, the first 54 and inner 56 pistons may move simultaneously, i.e., in unison, in the chamber 42. The first 54 and inner 56 pistons have a combined forward end area when moving in unison comprising the full circular area of the first forward end 54a of the first piston 54. Said another way, the combined forward end area is equal to the arithmetic sum of the annular first forward end area and the concentric circular second forward end area. Likewise, when the first 54 and inner 56 pistons move together, they create a combined rearward end area comprised of the full circular area of the first rearward end 54b. Or, in other terms, the combined rearward end area is equal to the arithmetic sum of the annular first rearward end area and the first forward end area.

Returning to FIG. 3, two air bleeding nipples 88 are shown threaded through the fluid cylinder 40 and communicating, respectively, with the inlet 44 and outlet 46 ends of the chamber 42. In the conventional manner, trapped air is exhausted from the vehicular braking system, and in particular, the intensifying apparatus 10, through the nipples 88.

In one embodiment, the fluid cylinder 40 also includes a fluid chamber 90 disposed above the cylindrical chamber 42. A small passage 92 extends between the cylindrical chamber 42 and the fluid chamber 90 for communicating fluid therebetween. A cover 94 is disposed over the chamber 90 and fastened with screws into the fluid cylinder 40. A lockout screw 96 is threaded through the cover 94 and extends toward the passage 92 in the chamber 90. The lockout screw 96 includes a nose portion 98 adapted to seal the passage 92 and thereby act as a valve to hydraulically lock the piston assembly 52 in the unactuated (FIG. 6) position. A fluid transfer tube 99 communicates fluid between the chamber 90 and the reservoir 28 of the master cylinder assembly 26. Therefore, when an excess of fluid builds up in the fluid chamber 90, the transfer tube 99 conveys the excess fluid back to the master cylinder assembly 26, 126. In another embodiment, the fluid transfer tube 99 is attached directly to the passage 92, and excess fluid is transferred from the cylindrical chamber 42 back to the master cylinder assembly 26, 126.

Figure 6:
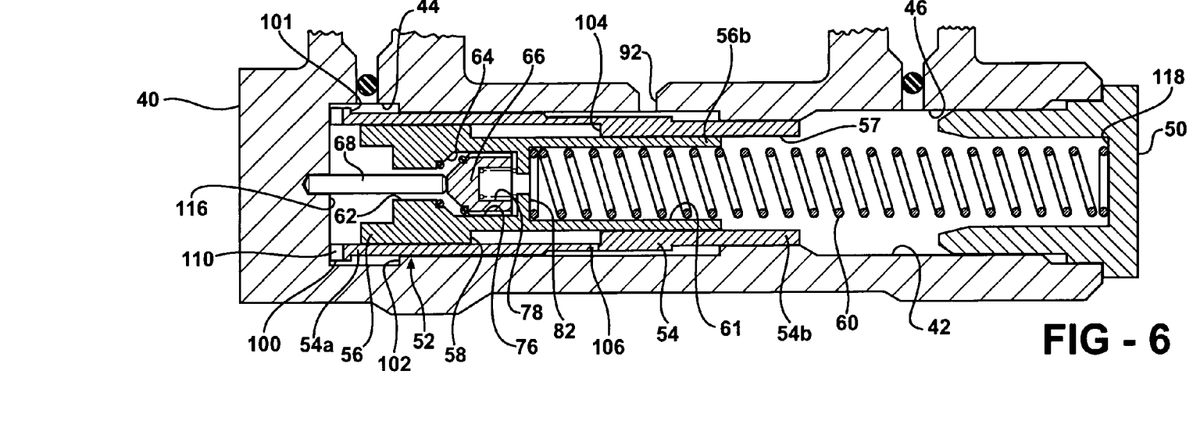
FIG. 6 is a partial cross-sectional view of the subject brake pressure intensifying apparatus at a first stage of operation.

Referring now to FIGS. 6–9, the operation of the preferred embodiment of the intensifying apparatus 10 will be addressed presently. In FIG. 6, an enlarged cross-section of the chamber 42 and piston assembly 52 of the intensifying apparatus 10 is illustrated in an unactuated, or low pressure position. The first 54 and inner 56 pistons are disposed in this unactuated position whenever the brake pedal 12 is not actuated or actuated only slightly so as to produce pressures up to about 200 pounds per square inch at the inlet end 44 of the chamber 42. With the piston assembly 52 in this position, the pin 68 presses the valve member 66 into a separated, or spaced, condition from the seat surface 64 of the flow passage 62 in order to form a path for fluid flow from the inlet end 44 to the outlet end 46 of the chamber 42. The piston assembly 52 remains in this unactuated condition until a sufficient pressure has been established in the hydraulic fluid line 34. Until the piston assembly 52 is moved from this unactuated condition, fluid flows freely through the apparatus 10 to the wheel cylinder actuators so that no pressure boost, or pressure multiplication, is realized.

Figure 7:
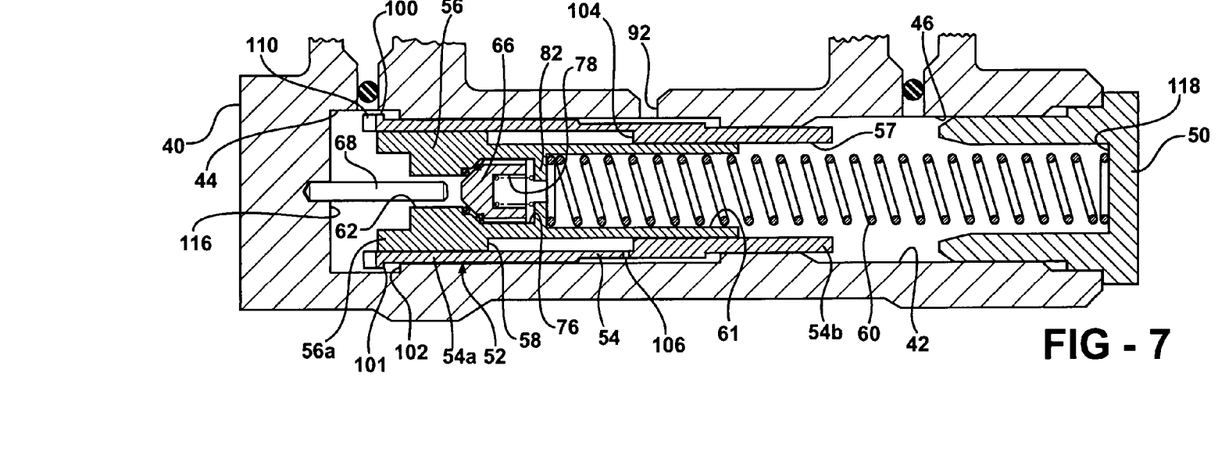
FIG. 7 is a partial cross-sectional view of the subject brake pressure intensifying apparatus at a second progressive stage of operation.

When the fluid pressure in the hydraulic fluid line 34, created at the master cylinder assembly 26, exceeds a predetermined value, for example, 200–300 pounds per square inch, the fluid pressure acting on the first 54 and inner 56 pistons begins to overcome the biasing pressure of the biasing means 60 and thereby urge, in unison, the first 54 and inner 56 pistons axially toward the outlet end 46 of the chamber 42. As shown in FIG. 7, when the first 54 and inner 56 pistons have moved a sufficient distance in the chamber 42, the pin 68 separates from the valve member 66 and allows the frustoconical sealing portion 74 of the valve member 66 to seat against the seat surface 64 in the flow passage 62. When this occurs, the fluid in the hydraulic fluid line 34, 134 between the master cylinder assembly 26, 126 and the inlet end 44 of the chamber 42 becomes isolated from, or separated from, the fluid in the hydraulic fluid line 34, 134 extending from the outlet end 46 to the brakes 11, 13 at the wheels of the vehicle 16. As soon as the valve member 66 isolates the fluid between the inlet end 44 and the outlet end 46 of the chamber 42, the pressure intensification, or boosting, phenomena can be achieved.

More particularly, the first rearward end area of the first piston 54 is smaller than the first forward end area of the first piston 54. Because fluid pressure is inversely proportional to the cross-sectional area over which a force is exerted thereon, a pressure amplification, or intensification, occurs between the inlet 44 and outlet 46 ends as the first piston 54 moves in the chamber 42.

Figure 8:
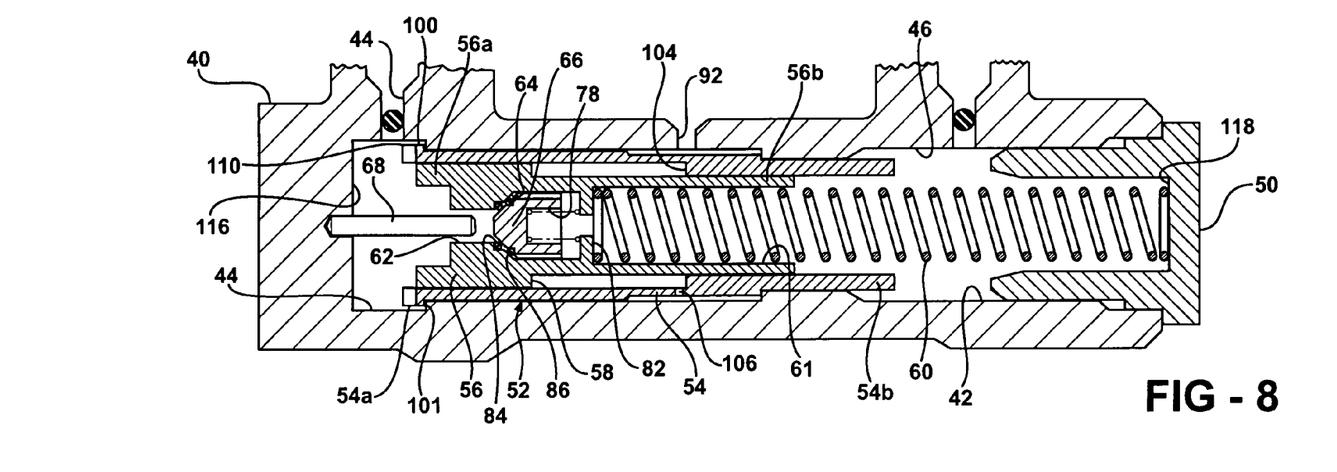
FIG. 8 is a partial cross-sectional view of the subject brake pressure intensifying apparatus at a third progressive stage of operation.

The first outer annular wall 100 of the first piston 54, which has an annular ledge 101 adapted to engage a corresponding annular ledge 102 extending radially inward from the chamber 42. As shown in FIG. 8, movement of the first piston 54 toward the outlet end 46 of the chamber 42 may bring into contact the first ledge 101 and the cylinder ledge 102. This, of course, prevents further axial movement of the first piston 54 toward the outlet end 46 of the chamber 42. However, the inner piston 56 is still free to move toward the outlet end 46 within the first piston 54. Nevertheless, an operator applying pressure on the brake pedal 12 may not apply constant pressure, and pressure fluctuations between the inlet 44 and outlet 46 ends of the intensifying apparatus 10 could result in erratic pressure amplification, as shown in the turbulent region of prior art FIG. 12. To counteract the pressure fluctuations, the first piston 54 remains free to move within the chamber 42 and adjusts based on the pressure fluctuations to result in the smooth pressure amplification curve shown in FIG. 13.

Figure 9:
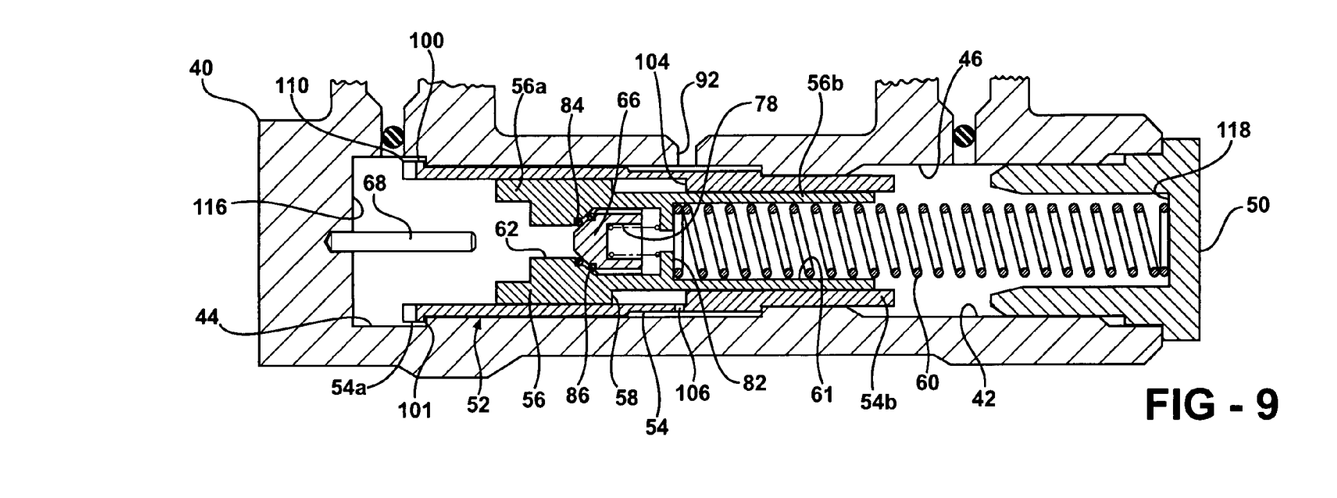
FIG. 9 is a partial cross-sectional view of the subject brake pressure intensifying apparatus at a fourth progressive stage of operation.
Figure 10:
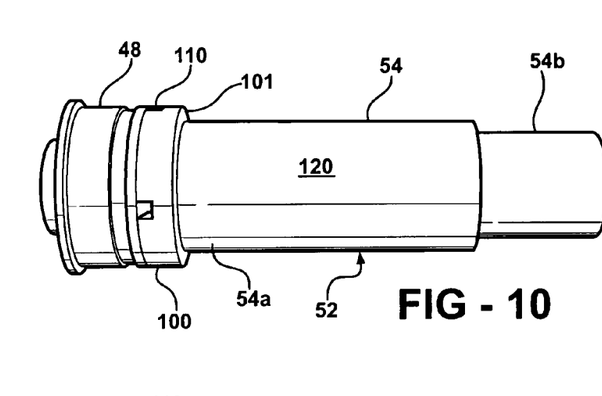
FIG. 10 is a side view of a first piston abutting a first end wall of a fluid cylinder at the first progressive stage of operation.
Figure 11:
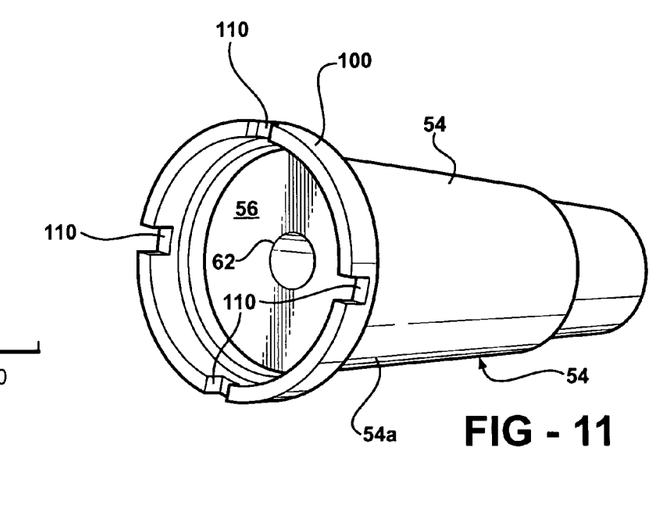
FIG. 11 is a perspective view of a piston assembly including the first piston and an inner piston.

As shown in FIG. 9, a continued pressure increase at the inlet end 44 of the chamber 42 urges the inner piston 56 axially in the chamber 42 relative to the first piston 54. This results in a further pressure boost, as the second rearward end area of the inner piston 56 is smaller than the second forward end area. It will be appreciated, however, that as the first 54 and inner 56 pistons move in the chamber 42, they will tend to slide relative to each other. That is, the first 54 and the inner 56 pistons will move in an alternating step-like manner yielding a smooth and gradual pressure intensification.

The outer rim 58 of the inner piston 56 is restricted in its axial movement by a second inner ledge 104 of the first piston 54. In order to prevent hydraulic lock in the space between the first 54 and inner 56 pistons and between the rim 58 and the second ledge 104, at least one port 106 is provided through the wall of the first piston 54 to allow fluid to pass to and from the chamber 90. Therefore, as the first 54 and inner 56 pistons move relative to the chamber 42 and relative to each other, fluid is continually moved to and from the chamber 90.

It has been found that a unique and gradual pressure amplification can be achieved when certain preferred ranges are maintained for the ratios between the first forward and rearward end areas, the second forward and rearward end areas and the combined forward and rearward end areas. Specifically, it has been determined that the ratio between the first forward end area and the first rearward end area is preferably between 60 and 70 percent of the ratio of the combined forward end area and the combined rearward end area. Also, the ratio between the combined forward end area and the combined rearward end area is preferably between 80 percent and 90 percent of the ratio between the second forward end area and the second rearward end area.

For example, in order to achieve the unique pressure amplification characteristics, a first piston 54 may be selected having a 1:1.5 ratio between its forward end area and its rearward end area. That is, the annular first forward end area would be 1.5 times larger than the annular first rearward end area. Therefore, applying this ratio for the first piston 54 to the preferred ranges specified above, the combined piston ratio, i.e., the first 54 and inner 56 pistons moving together, is preferably between 1:2.5 (60%) and 1:2.1 (70%). Further, the inner piston 56 preferably has a ratio between its respective end areas of between 1:3.1 (80% for 1:2.5) and 1:2.3 (90% for 1:2.1).

Figure 12:
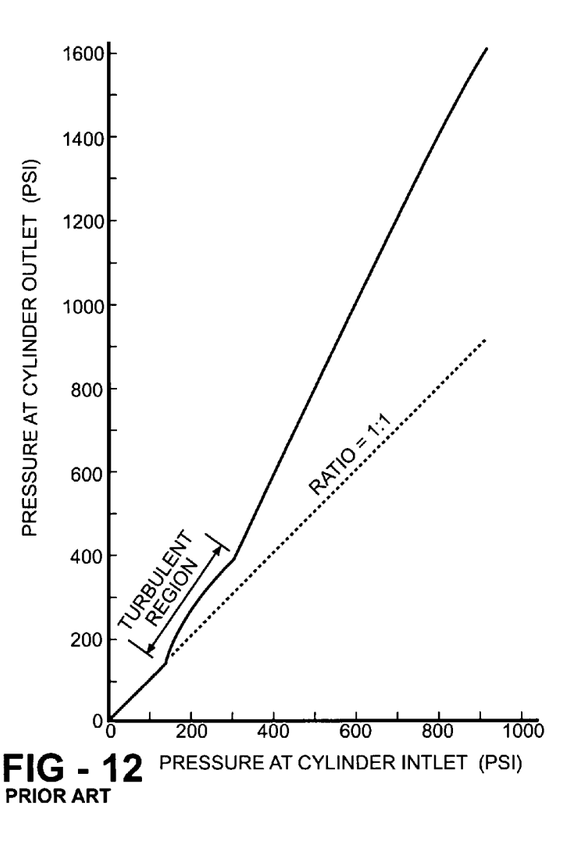
FIG. 12 is a graph showing the erratic pressure intensification provided by similar prior art devices.

When the various piston ratios are determined according to the aforementioned critical range, a smooth pressure intensification may be realized. Referring now to FIG. 12, a graphic representation is shown of a typical prior art pressure intensifying apparatus utilizing two telescoping pistons but whose ratios fall outside the preferred range of the subject invention. It will be seen that a Turbulent Region exists from the point at which the valve member 66 closes, preferably about 150 psi, to a substantially higher pressure, usually about 300–400 psi, at the inlet end 44 of the chamber 42. During this Turbulent Region, non-uniform and irregular pressure intensification values are generated at the outlet end 46 of the chamber 42. This means that unpredictable pressures will be applied to the brake wheel cylinders and possibly cause an under-braking or over-braking condition.

However, by selecting piston ratios within the preferred ranges set forth above, a smooth and predictable pressure amplification can be achieved for the embodiment set forth in FIG. 3, as shown in FIG. 13. It is clear from the graph of FIG. 13 that the subject preferred ranges will completely eliminate the Turbulent Region phenomena and provide a regular pressure amplification which will not have the tendency of producing an over-braking or under-braking condition. Therefore, the subject preferred ranges yield a safer intensifying apparatus 10. In particular, FIG. 14 illustrates the pressure ratio between the inlet 44 and outlet 46 pressures at increasing inlet 44 pressures for the embodiment as set forth in FIG. 3.

As shown in FIG. 3, the preferred embodiment of the intensifying apparatus 10 includes a plurality of strategically located glide rings 108. The glide rings 108 are disposed between the first piston 54 and the chamber 42 and between the first piston 54 and the inner piston 56. The glide rings 108 are self-lubricating O-ring type seals fabricated from a Teflon material. Teflon is preferred because it will swell when contacted by the fluid to perfect a pressure impregnable seal, while at the same time depositing a thin film of the fluid onto the surface of the associated travelling piston 54 or 56 to provide lubrication. Also, Teflon is preferred due to its tough wearing characteristics. Additionally, a stabilizer seal 107 is disposed between the first piston 54 and the inner piston 56 for preventing fluid leakage at high pressures. The stabilizer seal 107 is housed within an inner diameter of the first piston 54, adjacent the glide ring 108.

When pressure on the brake pedal 12 is released, or subsided, the first 54 and inner 56 pistons move in reverse order to that described above back to the initial unactuated position shown in FIG. 6.

Because the pressures at the outlet end 46 of the chamber 42 are much greater, up to 5 times greater, than the pressures at the inlet end 44 of the chamber 42, the frustoconical sealing portion 72 is provided on the valve member 66 to provide a superior seal with the seat surface 64 of the flow passage 62. The specific shape of these elements prevents leakage of fluid through the flow passage 62 during the highest pressure phases of operation to allow the highest output pressures to be achieved.

Optimal operation of the intensifying apparatus 10 is dependant upon several factors. The first factor is referenced above wherein one of the fluid cylinder 40, in particular the first end wall 116, and the first piston 54 define an aperture 110 for allowing the fluid to flow into the piston assembly 52. The second factor is fixing the relative ratios of the first 54 and inner 56 pistons according to the stated preferred ranges in order to achieve the smooth, gradual transition of pressure intensification. The third factor includes a carefully calculated pin 68 length to determine exactly the pressure at which the valve member 66 closes off the flow passage 62. The fourth factor is related to the third factor and includes the selection of the biasing means 60 having a spring constant calculated to exert an optimal resistance on the piston assembly 52. The fifth factor includes providing a sufficiently large reservoir 28, 128 in the master cylinder assembly 26, 126 to supply the volume of fluid required while the first 54 and inner 56 pistons move in the chamber 42. Superior results are achieved when each of these factors are optimally calculated and implemented in the intensifying apparatus 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope

The invention claimed is:

1. A hydraulic brake pressure intensifying apparatus (10) comprising:
    a fluid cylinder (40) axially extending between an inlet end (44) and an outlet end (46) and defining a cylindrical chamber (42) extending therethrough wherein said fluid cylinder (40) includes a first end wall (116) for sealing said chamber (42) proximal to said inlet end (44) and a second end wall (118) for sealing said chamber (42) proximal to said outlet end (46);
    a piston assembly (52) slidably disposed in said cylindrical chamber (42) for regulating fluid flow between said inlet end (44) and said outlet end (46) and including a first piston (54) having a first forward end (54a) adjacent said inlet end (44) and a first outer annular wall (100) extending from said first forward end (54a); and
    said apparatus (10) characterized by said first end wall (116) defining a plurality of apertures (110) adjacent to said first outer annular wall (100) for allowing the fluid to flow around said first outer annular wall (100) and into said piston assembly (52).

2. A hydraulic brake pressure intensifying apparatus (10) as set forth in claim 1 wherein said first end wall (116) comprises a plug (48) coaxial with said first piston (54) and having a diameter less than a diameter of said cylindrical chamber (42) at said inlet end (44) for sealing said chamber (42) at said inlet end (44).

3. A hydraulic brake pressure intensifying apparatus (10) as set forth in claim 2 wherein said plug (48) defines said plurality of apertures (110) adjacent to said first outer annular wall (100) for allowing the fluid to flow around said first outer annular wall (100) and into said piston assembly (52).

4. A hydraulic brake pressure intensifying apparatus (10) as set forth in claim 1 wherein said first piston (54) defines a cylindrical outer surface (120) and said first outer annular wall (100) coaxially extends from said cylindrical outer surface (120) at said first forward end (54a).

5. A hydraulic brake pressure intensifying apparatus (10) as set forth in claim 1 wherein said piston assembly (52) further includes an inner piston (56) concentrically disposed for telescopic sliding movement within said first piston (54).

6. A hydraulic brake pressure intensifying apparatus (10) as set forth in claim 5 wherein said piston assembly (52) further includes a stabilizer seal (107) disposed between said first piston (54) and said inner piston (56) for preventing fluid from leaking therebetween.

7. A hydraulic brake pressure intensifying apparatus (10) as set forth in claim 5 wherein said inner piston (56) defines a flow passage (62) for communicating the fluid between said inlet end (44) and said outlet end (46) of said fluid cylinder (40).

8. A hydraulic brake pressure intensifying apparatus (10) as set forth in claim 7 further comprising a valve member (66) disposed in said flow passage (62) for regulating fluid flow through said flow passage (62).

9. A hydraulic brake pressure intensifying apparatus (10) as set forth in claim 1 wherein said piston assembly (52) further includes a glide ring (108) disposed between said first piston (54) and said fluid cylinder (40) for preventing fluid from leaking therebetween.

10. An improved braking system for a vehicle comprising:
    (a) a brake (11, 13);
    (b) a master cylinder (30, 130) for applying pressure to fluid and supplying the fluid to said brake (11, 13);
    (c) a hydraulic fluid line (34, 134) extending from said master cylinder (30, 130) for channeling the fluid to said brake (11, 13); and
    (d) a brake pressure intensifying apparatus (10) incorporated into said hydraulic fluid line (34, 134) for exponentially amplifying the pressure of the fluid from said master cylinder (30, 130) to said brake (11, 13) and comprising:
        (i) a fluid cylinder (40) axially extending between an inlet end (44) and an outlet end (46); and
        (ii) a piston assembly (52) disposed in said cylinder (40) for regulating fluid flow between said inlet end (44) and said outlet end (46) and including a first piston (54) having a first forward end (54a) and a first outer annular wall (100) extending from said first forward end (54a);
        (iii) said system characterized by said fluid cylinder (40) defining a plurality of apertures (110) adjacent to said first outer annular wall (100) for allowing the fluid to flow around said first outer annular wall (100) and into said piston assembly (52).

11. An improved braking system as set forth in claim 10 wherein said master cylinder (30, 130) is further defined as a split master cylinder (130) having a first chamber (112) and a second chamber (114).

12. An improved braking system as set forth in claim 11 further comprising a first split cylinder piston (132) disposed in said split master cylinder (130) for compressing fluid in said first chamber (112) and supplying fluid pressure to said hydraulic fluid line (134) in a first linearly increasing function in response to movement of said first piston (54).

13. An improved braking system as set forth in claim 12 wherein said brake (11, 13) is further defined as a front brake (11) and said hydraulic fluid line (134) channels the fluid to said front brake (11).

14. An improved braking system as set forth in claim 13 further comprising a rear brake (13) and a second hydraulic fluid line (135) extending from said second chamber (114) of said split master cylinder (130) for channeling fluid to said rear brake (13).

15. An improved braking system as set forth in claim 14 further comprising a second split cylinder piston (138) disposed in said split master cylinder (130) for compressing fluid in said second chamber (114) and supplying fluid pressure to said second hydraulic fluid line (135) in a second linearly increasing function in response to movement of said second split cylinder piston (138).

16. A hydraulic brake pressure intensifying apparatus (10) comprising;
    a fluid cylinder (40) axially extending between an inlet end (44) and an outlet end (46), and
    a piston assembly (52) disposed in said fluid cylinder (40) for regulating fluid flow between said inlet end (44) and said outlet end (46) and including,
        a first piston (54) having a first forward end (54a) adjacent said inlet end (44) and a first outer annular wall (100) extending from said first forward end (54a),
        an inner piston (56) concentrically disposed for telescopic sliding movement within said first piston (54), and
        a stabilizer seal (107) disposed between said first piston (54) and said inner piston (56) for preventing fluid from leaking therebetween, and one of said fluid cylinder (40) and said first outer annular wall (100) defining an aperture (110) for allowing fluid to flow into said piston assembly (52) from said inlet end (44) of said fluid cylinder (40).

17. A hydraulic brake pressure intensifying apparatus (10) as set forth in claim 16 wherein said first outer annular wall (100) defines a plurality of apertures (110).

18. A hydraulic brake pressure intensifying apparatus (10) as set forth in claim 17 wherein said plurality of apertures (110) are equally spaced along said first outer annular wall (100).

19. A hydraulic brake pressure intensifying apparatus (10) as set forth in claim 16 wherein said fluid cylinder (40) defines a cylindrical chamber (42) extending therethrough with said piston assembly (52) slidably disposed in said cylindrical chamber (42).

20. A hydraulic brake pressure intensifying apparatus (10) as set forth in claim 19 wherein said fluid cylinder (40) includes a first end wall (116) for sealing said chamber (42) proximal to said inlet end (44) and a second end wall (118) for sealing said chamber (42) proximal to said outlet end (46).

21. A hydraulic brake pressure intensifying apparatus (10) as set forth in claim 20 wherein said first end wall (116) defines said aperture (110) adjacent to said first outer annular wall (100) for allowing the fluid to flow around said first outer annular wall (100) and into said piston assembly (52).

22. A hydraulic brake pressure intensifying apparatus (10) as set forth in claim 21 wherein said first end wall (116) comprises a plug (48) coaxial with said first piston (54) and having a diameter less than a diameter of said cylindrical chamber (42) at said inlet end (44) for sealing said chamber (42) at said inlet end (44).

23. A hydraulic brake pressure intensifying apparatus (10) as set forth in claim 22 wherein said first end wall (116) defines said aperture (110) adjacent to said first outer annular wall (100) for allowing the fluid to flow around said first outer annular wall (100) and into said piston assembly (52).

24. A hydraulic brake pressure intensifying apparatus (10) as set forth in claim 16 wherein said piston assembly (52) further includes a glide ring (108) disposed between said first piston (54) and said inner piston (56) for further preventing fluid from leaking therebetween.

25. A hydraulic brake pressure intensifying apparatus (10) as set forth in claim 16 wherein said first piston (54) defines a cylindrical outer surface (120) and said first outer annular wall (100) coaxially extends from said cylindrical outer surface (120) at said first forward end (54a).

26. A hydraulic brake pressure intensifying apparatus (10) as set forth in claim 16 wherein said inner piston (56) defines a flow passage (62) for communicating the fluid between said inlet end (44) and said outlet end (46) of said fluid cylinder (40).

27. A hydraulic brake pressure intensifying apparatus (10) as set forth in claim 26 further comprising a valve member (66) disposed in said flow passage (62) for regulating fluid flow through said flow passage (62).

28. An improved braking system for a vehicle comprising;
   (a) a front brake (11) and a rear brake (13),
   (b) a split master cylinder (130) having a first chamber (112) and a second chamber (114) for applying pressure to fluid and supplying the fluid to said brakes (11, 13),
   (c) a hydraulic fluid line (134) extending from said master cylinder (130) for channeling the fluid to said front brake (11),
   (d) a first split cylinder piston (132) disposed in said split master cylinder (130) for compressing fluid in said first chamber (112) and supplying fluid pressure to said hydraulic fluid line (134) in a first linearly increasing function in response to movement of said first piston (54),
   (e) a second hydraulic fluid line (135) extending from said second chamber (114) of said split master cylinder (130) for channeling fluid to said rear brake (13), and
   (f) a brake pressure intensifying apparatus (10) incorporated into said hydraulic fluid line (134) for exponentially amplifying the pressure of the fluid from said master cylinder (130) to said front brake (11) and comprising,
      (i) a fluid cylinder (40) axially extending between an inlet end (44) and an outlet end (46), and
      (ii) a piston assembly (52) disposed in said cylinder (40) for regulating fluid flow between said inlet end (44) and said outlet end (46) and including a first piston (54) having a first forward end (54a) and a first outer annular wall (100) extending from said first forward end (54a),
      (iii) said system characterized by one of said fluid cylinder (40) and said first outer annular wall (100) defining an aperture (110) for allowing fluid to flow into said piston assembly (52) from said inlet end (44) of said fluid cylinder (40).

29. An improved braking system as set forth in claim 28 wherein said plurality of apertures (110) are equally spaced along said first outer annular wall (100).

30. An improved braking system as set forth in claim 28 wherein said fluid cylinder (40) defines said aperture (110) adjacent to said first outer annular wall (100) for allowing the fluid to flow around said first outer annular wall (100) and into said piston assembly (52).

31. An improved braking system as set forth in claim 28 further comprising a second split cylinder piston (138) disposed in said split master cylinder (130) for compressing fluid in said second chamber (114) and supplying fluid pressure to said second hydraulic fluid line (135) in a second linearly increasing function in response to movement of said second split cylinder piston (138).

* * * * *